A. SCHREIBER & O. MEISTER.
AUTOMOBILE COVERING.
APPLICATION FILED MAY 5, 1909.

958,183.

Patented May 17, 1910.

Witnesses:
Edward H. Schorr.
N. R. Schulz.

Inventors:
Albin Schreiber
and Otto Meister
by Arthur E. Zucker, Atty.

UNITED STATES PATENT OFFICE.

ALBIN SCHREIBER AND OTTO MEISTER, OF UNTERMHAUS, NEAR GERA, GERMANY.

AUTOMOBILE-COVERING.

958,183.  Specification of Letters Patent.  Patented May 17, 1910.

Application filed May 5, 1909. Serial No. 494,051.

*To all whom it may concern:*

Be it known that we, ALBIN SCHREIBER and OTTO MEISTER, subjects of the German Emperor, and residents of Untermhaus, near Gera, Germany, have invented certain new and useful Improvements in Automobile-Coverings, of which the following is a specification.

This invention relates to a novel covering or hood for automobiles and similar vehicles which is so constructed that the wind pressure is taken up by the frame work of the hood so that the awning carried by said frame work, is not subjected to any undue strain. Our improved hood is further so constructed that the front section thereof may be readily folded against its rear section without collapsing the latter. In this way, the front seats of the automobile may be uncovered, while the rear seats thereof may be properly protected against wind, rain etc.

Figure 1:
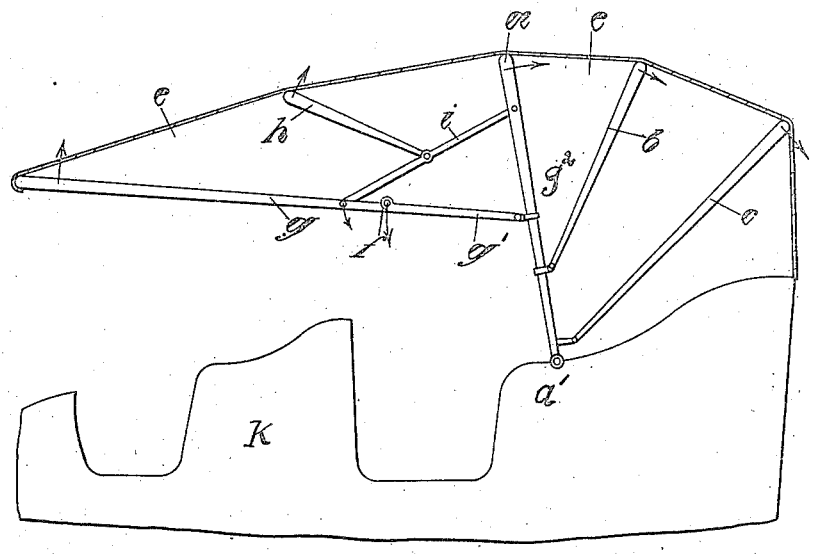

In the accompanying drawing: Figure 1 is a side view of an automobile body provided with our improved hood, showing the latter unfolded, and Fig. 2 a similar view showing the hood folded and with the awning omitted.

The hood comprises essentially a main hoop $a$ pivoted to the automobile body $k$ as at $a^1$. To hoop $a$ are fulcrumed the rear hoops $b$ and $c$, hoops $a$, $b$ and $c$ serving jointly as support for the rear section of an awning $e$. The front section of the latter is supported by an outrigger hoop $g$ connected by stop hinges $f$ to links $g^1$ which are in turn fulcrumed to hoop $a$ as at $g^2$. Hinges $f$ are so constructed that hoop $g$ may be readily folded upward, while a downward movement of the same beyond alinement with links $g^1$ is prevented. Hoop $g$ is by braces $i$ connected to hoop $a$, while an auxiliary hoop $h$, pivoted to braces $i$, serves as support for the front section of awning $e$ intermediate hoops $a$ and $g$.

Figure 2:
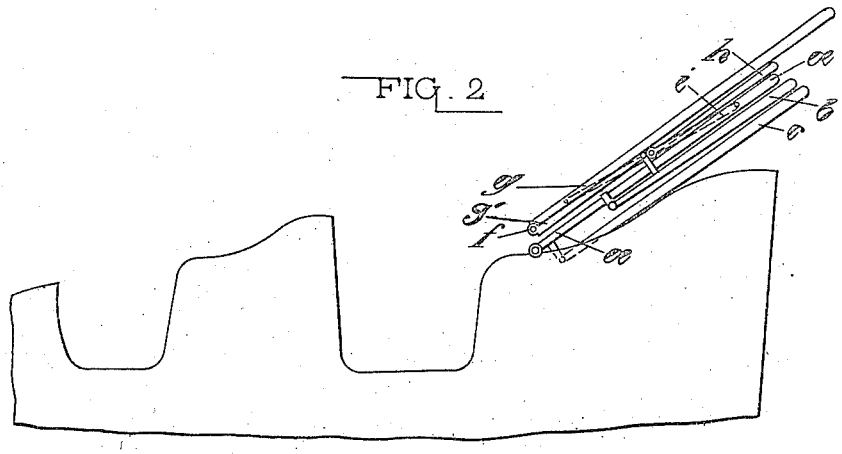

In order to collapse the hood, hoop $g$ is slightly raised, parts $g$, $g^1$ are folded against hoop $a$ and the rear section of the hood is folded to occupy the position illustrated in Fig. 2.

If desired, front hoop $g$ may be folded against hoop $a$ without collapsing the rear section of the hood, so that parts $a$, $b$ and $c$ remain in the position shown in Fig. 1. This form of the hood is particularly desirable in case of side winds so that the occupants of the rear seats are properly protected. If the hood were entirely unfolded, its lowered front section would render conditions worse by catching the wind while the occupants of the front seat would nevertheless be unprotected.

We claim:

An automobile hood, comprising a main hoop, an articulated outrigger hoop pivoted thereto and having stop-hinges intermediate its inner and outer members, a covering secured at its front end to the top of the outer member, braces connecting said outer member with the main hoop, and an auxiliary hoop pivoted to said braces intermediate the outrigger hoop and main hoop and supporting the covering back of the outrigger hoop.

In testimony whereof we affix our signatures.

ALBIN SCHREIBER.
OTTO MEISTER.

In the presence of—
  F. HENHAN,
  CHARLES NEUER.